United States Patent [19]

Inoue et al.

[11] 4,131,872
[45] Dec. 26, 1978

[54] ULTRASONIC WAVE ECHO-TYPE SWITCH

[75] Inventors: Hiromitsu Inoue, Kyoto; Susumu Katayama; Hiroshi Ohashi, both of Hirakata, all of Japan

[73] Assignee: Matsushita Electric Works, Ltd., Osaka, Japan

[21] Appl. No.: 749,072

[22] Filed: Dec. 9, 1976

[30] Foreign Application Priority Data

Dec. 15, 1975 [JP] Japan .............................. 50-149810
Dec. 15, 1975 [JP] Japan .............................. 50-149826
Jun. 14, 1976 [JP] Japan .............................. 51-69520

[51] Int. Cl.² ............................................. G01S 9/66
[52] U.S. Cl. .................................. 340/1 R; 340/3 E
[58] Field of Search ............................ 340/3 E, 1 R

[56] References Cited

U.S. PATENT DOCUMENTS

3,474,400 10/1969 Auer, Jr. et al. ................... 340/1 R
3,500,302 3/1970 Moss, Jr. et al. ................ 340/3 E X Primary Examiner—Richard A. Farley
Attorney, Agent, or Firm—Burns, Doane, Swecker & Mathis

[57] ABSTRACT

An echo-type switch using ultrasonic wave for detecting any object present in a predetermined area with reliable operation irrespective of environmental variations or foreign waves. After the wave is once radiated, the detection is suspended for a fixed time period $T_1$ and presence or absence of reflected wave received is confirmed during another period $T_2$. If reflected wave is received in the period $T_2$, this period is again set for further confirming if the received wave continues and, until absence of the received wave is confirmed after several times of the waves received during the period $T_2$, next ultrasonic wave is not radiated. Only in case the reflected wave received continues for more than two of the periods, the presence of the object to be detected in the area is indicated.

5 Claims, 6 Drawing Figures

ULTRASONIC WAVE ECHO-TYPE SWITCH

BCKGROUND OF THE INVENTION

This invention relates to echo-type swithes using ultrasonic wave pulses.

Generally,, the ultrasonic wave pulse echo-type switches are to be operated by radiating repeatedly ultrasonic wave pulses into space and ascertaining an existence of an object in a predetermined area lying in a direction in which the ultrasonic waves are radiated with any reflections from the object existing in the area and can be applied to such various uses as for crime prevention, automatic door switches and the like.

However, the conventional echo-type switch has such defects as follows:

(i) Mis-operation caused by echoes:

When the switch is set in a room or particularly in such place where mutually parallel surfaces are opposed to each other as, for example, where a ceiling and floor or walls are respectively opposed to each other, radiated ultrasonic wave pulses will reciprocate several times between the parallel surfaces and the echo of a signal radiated in the preceding period will remain until the next period so as to mis-operate the switch. This echo time will greatly vary depending on the temperature and humidity.

(ii) Mis-operation caused by foreign ultrasonic waves:

In the natural space, there are noise waves containing such components in the ultrasonic wave range as sounds of telephone bell, jetting of air nozzles, collision of metals, friction of motor car brakes and so on. Mis-signals are often caused by such noises.

(iii) Mis-operation caused after installation and setting:

Though the switch operates normally for a while after it is installed, it will later mis-signal. This will be caused when a reflection slightly lower than the lowest detection level is overlooked at the time of setting the switch. In the conventional system, such reflection has not been able to be distinguished.

The present invention has been suggested to remove such defects of conventional switches as above.

A primary object of the present invention is, therefore, to provide an object detecting switch which is positive in the operation with respect to variations in the environment and temperature.

Another object of the present invention is to provide an object detecting switch which does not mis-signal with respect to foreign ultrasonic waves.

A further object of the present invention is to provide an object detecting switch allowing a confirmation whether the setting if optimum or not to be performed at the time of setting.

BRIEF DESCRIPTION OF THE DRAWINGS

The present invention shall now be explained in detail with reference to certain embodiments illustrated in accompanying drawings, in which.

DETAILED DESCRIPTION

Figure 1:
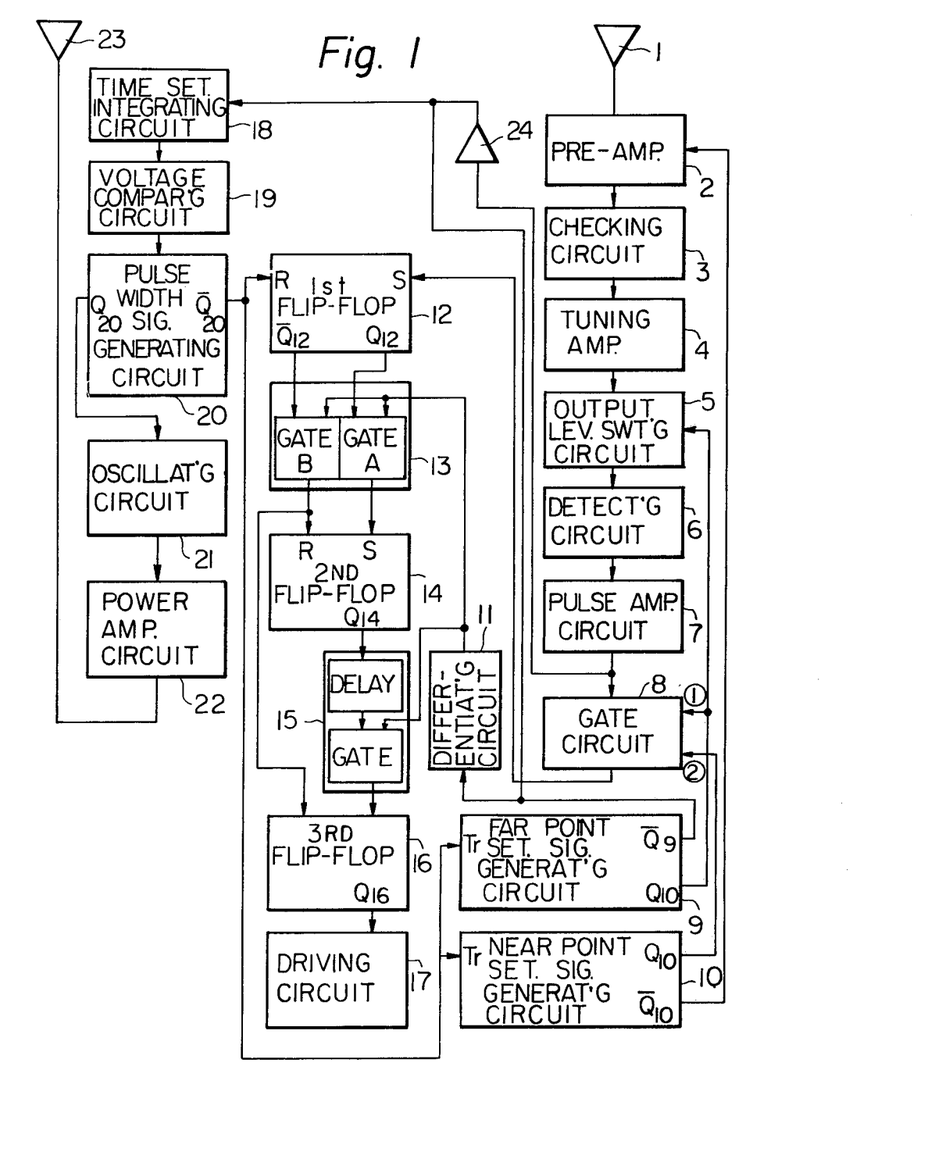
FIG. 1 is a block diagram of an echo-type switch according to the present invention.

Referring first to FIG. 1 which shows a block diagram of a switch of the present invention, an ultrasonic wave pulse entering a receiver 1 is converted thereby to an electric signal, which is amplified in a pre-amplifier 2. The output of this pre-amplifier 2 is provided through a checking circuit 3 to a tuning amplifier 4 to be tuned and amplified and is further provided through an output level switching circuit 5 to a detecting circuit 6 to be thereby detected. The detected output is amplified by a pulse amplifying circuit 7 so as to be an input to a gate circuit 8. The gate circuit 8 is driven by the output of the pulse amplifier 7 and also outputs of later described far point setting signal generating circuit 9 and near point setting signal generating circuit 10. The output of the gate circuit 8 is presented to a first RS flip-flop 12 as its setting input, the output of which is added to a gate 13. The output of this gate 13 is added as an input to a second RS flip-flop 14, the output of which is added in turn to a third RS flip-flop 16 through a delaying circuit 15, and the output of this third RS flip-flop 16 actuates a driving circuit 17.

The above described far point setting signal generating circuit 9 and near point setting signal generating circuit 10 are triggered by an output of a pulse width signal generating circuit 20, which performs a function of determining the time width of the ultrasonic wave radiation, while causing far point setting signals and near point setting signals generated by the circuits 9 and 10, and drives an oscillating circuit 21, power amplifying circuit 22 and ultrasonic wave emitter 23 for a fixed time to have ultrasonic wave pulses emitted from the emitter 23. The pulse width signal generating circuit 20 for the emitted pulses is driven by pulses provided by a time setting integrating circuit 18 and voltage comparing circuit 19. Further, the output of the pulse amplifying circuit 7 through an inverter 24 and the output of the far point setting signal generating circuit 9 directly are also applied to the time setting integrating circuit 18 and then to the voltage comparing circuit 19.

Figure 2:
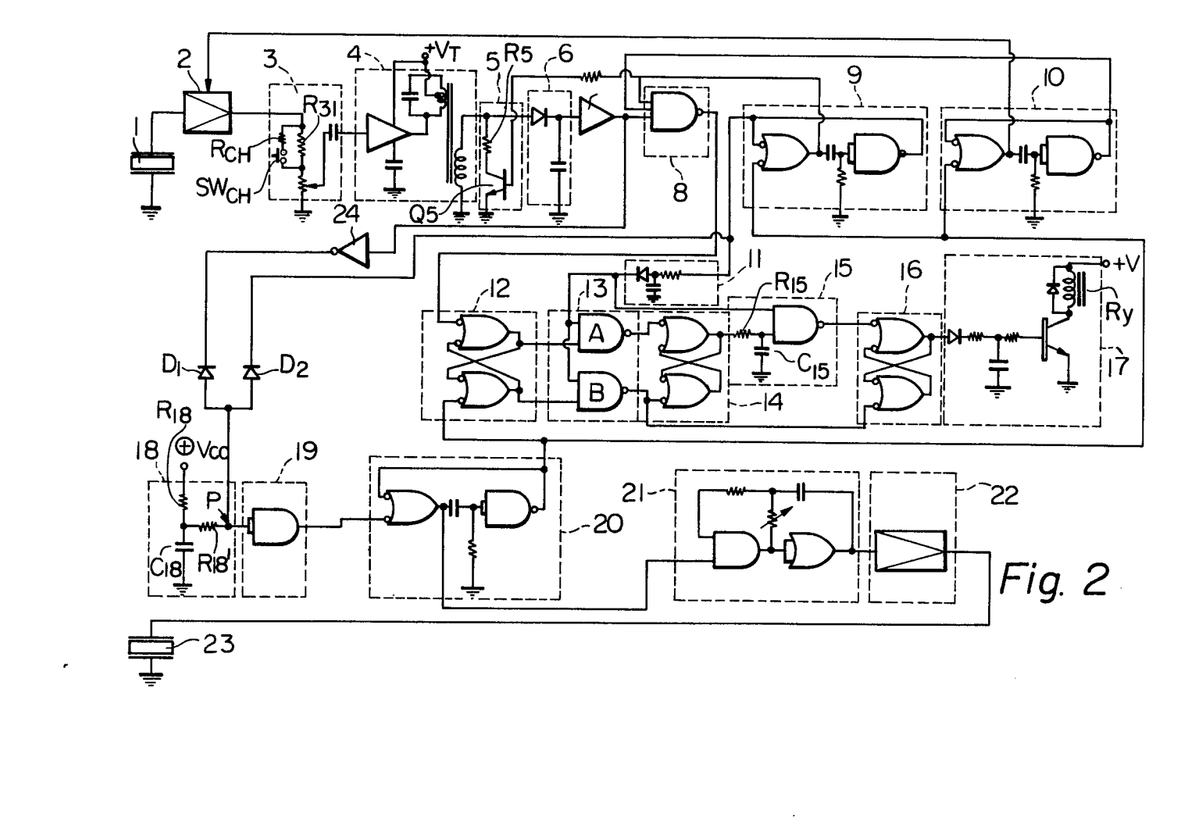
FIG. 2 is a circuit diagram of a practical embodiment.

A practical circuit arrangement of the present invention shall be described more particularly with reference to FIG. 2 showing an embodiment of the ultrasonic wave pulse echo-type switch.

The wave receiver 1 and pre-amplifier 2 may be of any conventional ones, respectively, and need no specific explanations of them here. The checking circuit 3 comprises a variable resistor (unnumbered), two resistors $R_{31}$ and $R_{CH}$ and a change-over switch $SW_{CH}$, wherein the resistor $R_{31}$ is connected to an end of the variable resistor and a series circuit of the resistor $R_{CH}$ and change-over switch $SW_{CH}$ is connected in parallel to the resistor $R_{31}$. The tuning amplifier 4 comprises an amplifier, condenser and transformer, a primary coil of which transformer and the condenser are connected in parallel and this parallel connection is made to be a tuning load of the amplifier, while a tuning output is obtained from a secondary coil of the transformer. The output level switching circuit 5 is formed with a transistor $Q_5$ and resistor $R_5$ in such that the emitter of the transistor $Q_5$ is grounded while the collector is connected through the resistor $R_5$ to the secondary coil of the transformer in the tuning amplifier 4, and the base of the transistor $Q_5$ is connected to an output end of a NOR circuit of the far point setting signal generating circuit 9 which will be later detailed. The gate circuit 8 comprises a NAND circuit having three inputs. The far point setting signal generating circuit 9 comprises a NOR circuit, condenser, resistor and NAND circuit, that is, a series circuit of the condenser and resistor is connected between the output terminal of the NOR circuit and the ground, and junction point of the condenser and resistor is connected to the input terminal of the NAND circuit, while the output terminal of the NAND circuit is connected to one of two input terminals of the NOR circuit. The near point setting signal generating circuit 10 is formed to be of the same structure as the far point setting signal generating circuit 9. The differentiating circuit 11 comprises a resistor, condenser and diode arranged in such that the resistor is connected at an end to the anode of the diode, the junction point of which is grounded through the condenser, while the other end of the resistor is connected to the output terminal of the far point setting signal generating circuit 9 and the cathode of the diode is connected to setting input terminal of the first RS flip-flop 12. The flip-flop 12 comprises two NOR circuits, respective output terminals of which are connected mutually to one of two input terminals of the other. The second and third RS flip-flops 14 and 16 are respectively formed to be of the same structure as the first RS flip-flop 12. The gate circuit 13 comprises two NAND circuits A and B respectively having two imput terminals, to each one of which terminals the cathode of the diode in the differentiating circuit 11 is connected while the others of which are connected respectively to the output terminals of the respective NOR circuit forming the first flip-flop 12, and the respective output terminals of the NAND circuits A and B are connected respectively to one of two input terminals of the second RS flip-flops 14. An output terminal of the flip-flop 14 is connected to a delaying circuit 15 which comprising a delay circuit and NAND circuit. The delay circuit of this circuit 15 comprises a resistor $R_{15}$ and condenser $C_{15}$ which are forming a series circuit connected between the output terminal of the second flip-flop 14 and the ground, and the junction point of the resistor $R_{15}$ and $C_{15}$ is connected to one of two input terminals of the NAND circuit of this circuit 15 while the other input terminal is connected to the cathode of the diode in the differentiating circuit 11. The output terminal of the NAND circuit in the circuit 15 is connected to a setting input terminal of the third RS flip-flop 16, whereas a resetting input terminal of the flip-flop 16 is connected to the output terminal the NAND circuit B in the gate circuit 13. The driving circuit 17 comprises diodes, resistors, condenser, transistor and relay, which are arranged in such that an output terminal of the third flip-flop 16 is connected to the base of the transistor through a series circuit of a diode and two resistors, the emitter of which transistor is grounded, whereas its collector is connected to an electric source $+V$ through a parallel circuit of a relay $R_y$ and another diode. The time setting integrating circuit 18 comprises resistors $R_{18}$ and $R_{18}'$ and condenser $C_{18}$, that is, a series circuit of the resistor $R_{18}$ and condenser $C_{18}$ is connected between an electric source $+V_{cc}$ and the ground, and the junction point of the resistor $R_{18}$ and condenser $C_{18}$ is connected through the resistor $R_{18}'$ to the input terminal of the voltage comparing circuit 19 and also to respective anodes of diodes $D_1$ and $D_2$. The voltage comparing circuit 19 comprises a NAND circuit, of which output terminal is connected to an input terminal of a NOR circuit forming the pulse width sigal generating circuit 20 together with a condenser, resistor and NAND circuit. This circuit 20 has substantially the same structure as the respective far point and near point setting signal generating circuits 9 and 10. The oscillating circuit 21 comprises an AND circuit, OR circuit, resistor and condenser, which are connected in such that output terminal of the AND circuit is connected to the input terminal of the OR circuit, of which output terinal is connected through a series circuit of the condenser and resistors to one of two input terminals of the AND circuit, and the junction point of the condenser and resistor is connected through a variable resistor to the output terminal of the AND circuit. Outputs of this oscillating circuit 21 is amplified by the power amplifying circuit 22 and are provided to the emitter 23, so as to emit the ultrasonic wave pulses therefrom to the air.

The operation of the present invention shall now be referred to in the followings.

Radiation of Ultrasonic Waves

The time setting integrating circuit 18 has a voltage Vcc impressed at both ends. Now, if the terminal voltage of the condenser $C_{18}$ is 0 at a time $t = 0$ (if $R_{18}' << R_{18}$, diodes $D_1$ and $D_2$ are cut off and the input impedance of the voltage comparing circuit 19 is well larger than that of the resistor $R_{18}$), the condenser $C_{18}$ will be charged through the resistor $R_{18}$ and, therefore, the potential of the output terminal point P of the circuit 18 will rise with the lapse of time.

The voltage comparing circuit 19 is so made as the generate an output when the input voltage reaches a set value $V_{TH}$. In this embodiment, it is so made as to generate a high level output when the input voltage is below $V_{TH}$ and to generate a low level output voltage when the input voltage is above $V_{TH}$.

The output terminal point P of the integrating circuit 18 reaches a value $V_{TH19}$ after the lapse of a fixed time $T_2$ determined by $R_{18}$, $C_{18}$ and Vcc. Therefore, at this time point, the output level of the voltage comparing circuit 19 turns to a low potential from the high potential.

The pulse width signal generating circuit 20 is triggered by this low level signal to generate a pulse signal of a fixed width. The pulse width signal generated by this pulse width signal generating circuit 20 is to determine the radiating time width of the ultrasonic wave pulses and is selected to be, for example, of 2m.sec.

The time signal of this pulse width signal generating circuit 20 is applied to the oscillating circuit 21 and the oscillatory output oscillating only in the period corresponding to this signal is transmitted to the amplifier 22.

Figure 3:
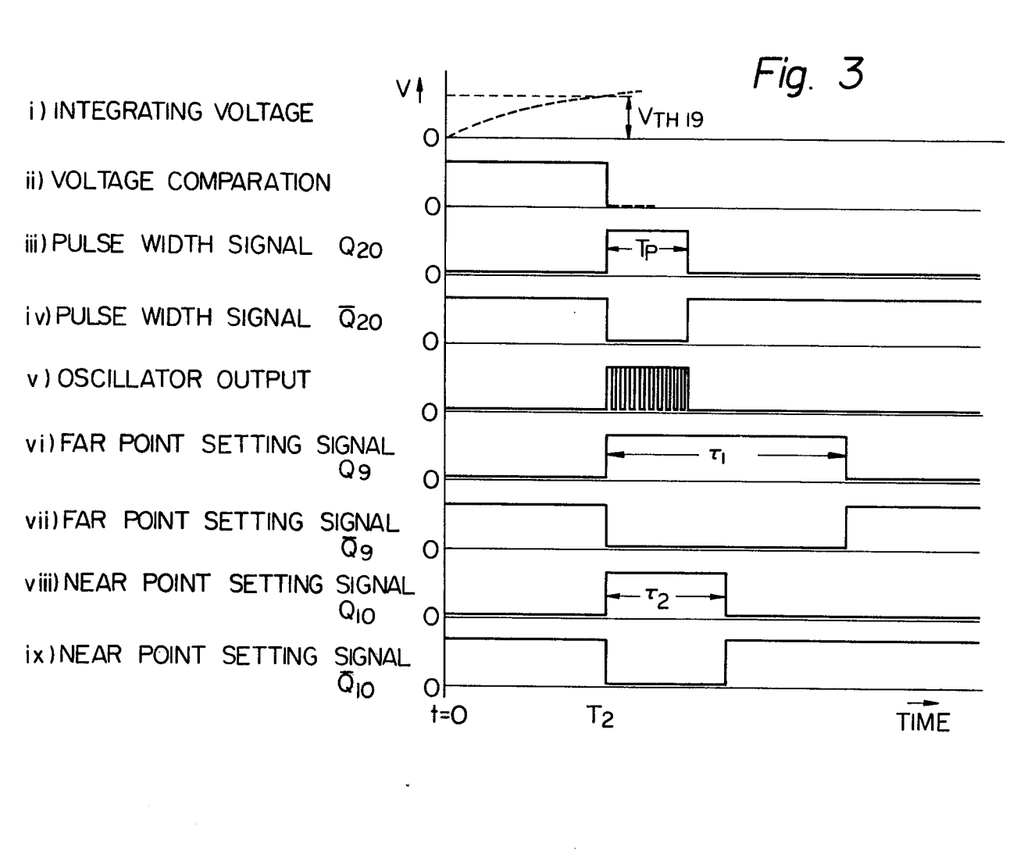
FIG. 3 is a time chart for explaining radiations of ultrasonic waves and generation of far point and near point setting signals.

The amplifier 22 amplifies this signal and provides the amplified signal to the emitter 23, to excite it and radiate ultrasonic waves into the space at a frequency of, for example, 40 KHz. The described manner is shown in FIG. 3 of respective wave forms (i) to (v).

Receiving Waves After Reflection

The receiver 1 is set near the emitter 23 and is so arranged as to be directed substantially in the same direction as the emitter 1.

The ultrasonic wave pulse radiated from the emitter 1 will be reflected, and come back to the receiver 23, where the reflected pulse will be again converted to an electric signal by the receiver, if there is an object to be detected in the space in which the pulse propagates.

After the ultrasonic wave is radiated and reflected by any object, until it reaches the receiver, if the distance between the detected object and the emitter and receiver is L, a time $\bar{L}$ represented as $\bar{L} = 2L/c$ (wherein $c$ is the sonic velocity) and, therefore, if the maximum and minimum relative distances between the region to be detected and the emitter and receiver are respectively $L_1$ and $L_2$, the signals received between the times $\bar{L}_1 = 2L_1/c$ and $\bar{L}_2 = 2L_2/c$ may be detected.

The far point setting signal generating circuit 9 is triggered by the above mentioned pulse width signal to generate a pulse signal of the time width $\bar{L}_1$ corresponding to the above maximum distance L. The near point setting signal generating circuit 10 is triggered by the same signal to generate a pulse signal of the time width $\bar{L}_2$ corresponding to the minimum distance $L_2$ in the same manner (see wave forms (vi) to (ix) in FIG. 3).

Figure 4:
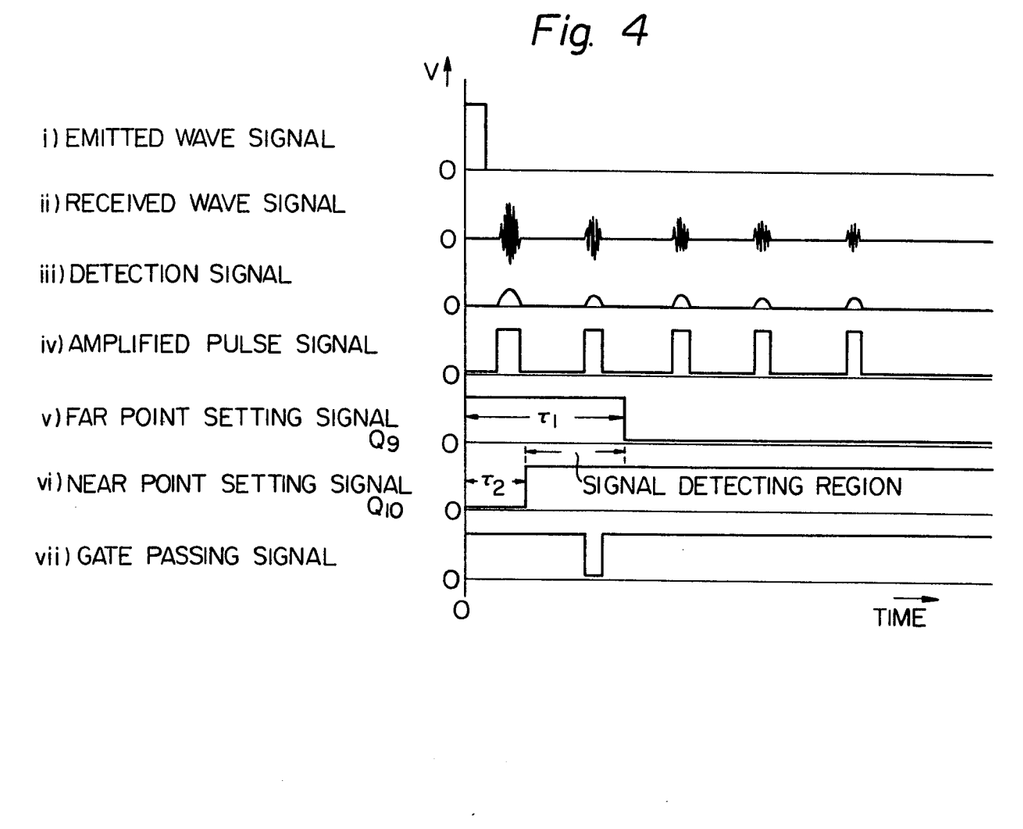
FIG. 4 is a time chart for explaining operations of a detecting gate employed in the embodiment of FIG. 2.

The signal received by the receiver 1 becomes a reflected wave appearing repeatedly with the lapse of time as shown by a wave form (ii) of FIG. 4. This is caused by several objects located at separate distances or by reciprocating waves between the opposing wall surfaces or the like.

This signal is amplified through the pre-amplifier 2, checking circuit 3 and tuning amplifier 4 and the amplified signal is passed through the level switching circuit 5 to be detected by the detecting circuit 6 and is then amplified by the pulse amplifier circuit 7 to be subjected to a wave form shaping so as to be of a pulse train (see wave forms (iii) and (iv) in FIG. 4).

Selection of Signals

The signals obtained as described above are led to the gate circuit 8 so as to be selected.

In the embodiment shown in FIG. 2, such far point and near point signals $Q_9$ and $\bar{Q}_{10}$ as shown in (v) and (vi) in FIG. 4 are applied to the first and second input terminals of the NAND circuit of the gate 8 and the signal detecting regions are limited to be only between $\bar{L}_2$ and $\bar{L}_1$. Therefore, as shown in FIG. 4, among the reflected pulses shown in the received signals (ii) to (iv), only the signals corresponding to these $\bar{L}_2$ to $\bar{L}_1$ are obtained as in (vii) in FIG. 4.

Counting

In case there is a signal having passed through the gate circuit 8 and if the relay is operated immediately, there will be a possibility of causing a mis-signal with external noises or the like. Therefore, a counting of incoming pulses is performed in the present invention.

Basic principle of this pulse counting is such that, if there is a signal passing during one gate period, it will be once stored, if there is a signal passing during the gate period again in the cycle following it, the relay will be operated and, if there is no signal during the gate period of the successively generating cycle, the signal driving the relay will be reset. Further, even if there is a signal passing through the gate during a certain period, if there is no passing signal during the gate period of the cycle following it, the stored signal will be reset.

Figure 5:
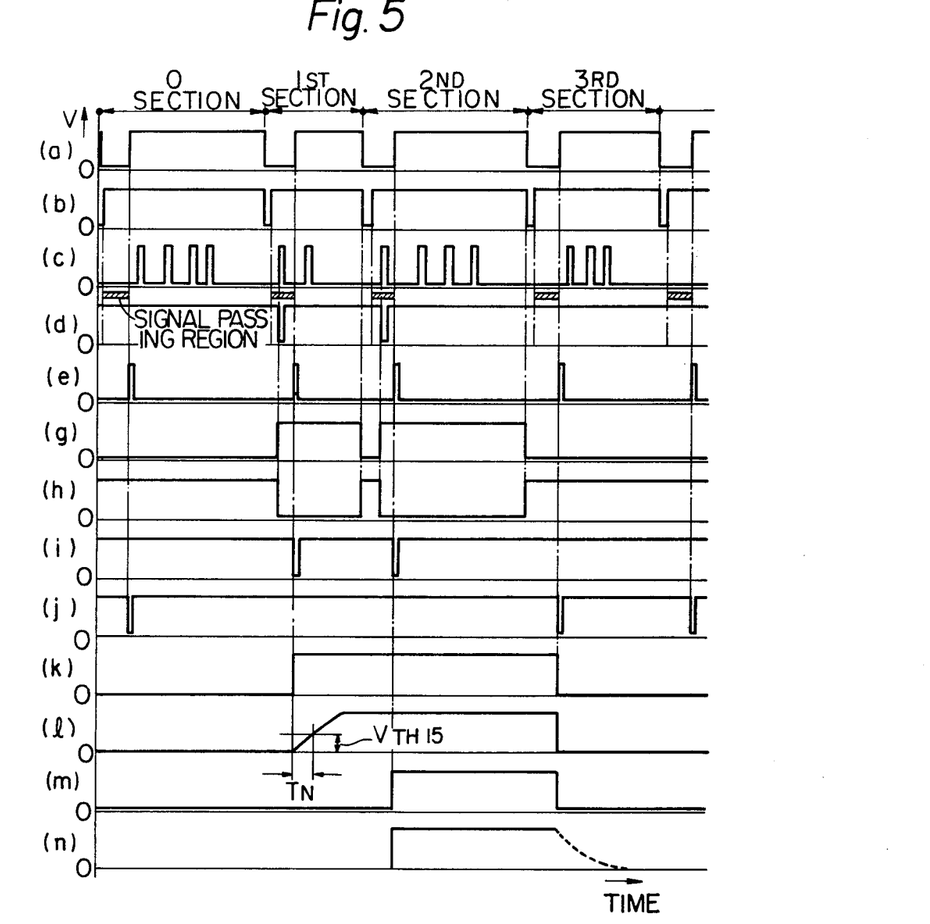
FIG. 5 is a time chart for explaining counting operation of the embodiment of FIG. 2.

In other words, when there is a signal passing through the gate circuit 8 during the gate period of a cycle (the first section in (d) of FIG. 5 showing gate passing signals), the first RS flip-flop 12 will be set by this signal. The flip-flop 12 is kept set at least until the far point setting signal ends and is reset at the latest before the next cycle begins. In the embodiment of FIG. 2, it is made to be reset by a pulse width signal and is, therefore, reset simultaneously with the beginning of the next cycle (the first or second section in (g) of FIG. 5 showing flip-flop's output $Q_{12}$, while the flip-flop's output $\bar{Q}_{12}$ of (h) of FIG. 5 is a reverse phase signal of this signal).

On the other hand, the far point setting signal $\bar{Q}_9$ (shown as (a) in FIG. 5) is differentiated with a differentiating circuit 11 and its positive signal is taken out (see (e) of FIG. 5 of the differentiating circuit output). This signal corresponds to the last end of the detecting period. Whether there is a signal during the gate period can be confirmed before the differentiated signal is generated. In case there is a signal, the flip-flop 12 will have turned but, in case there is no signal, it will not have turned.

This differentiated signal is applied to each of two input terminals of two NAND circuits A and B of the gate 13.

The NAND circuit A of the gate 13 is controlled by one output $Q_{12}$ of the flip-flop 12 and the other NAND circuit B is controlled by the output $\bar{Q}_{12}$ of the flip-flop 12 in the same manner.

If there is a signal passing through the gate circuit 8, a differential output will be generated. At this time point, the flip-flop 12 is set, its output $Q_{12}$ will be positive while $\bar{Q}_{12}$ will be 0 (the first section of (i) of gate A output and (j) of gate B output of the circuit 13 in FIG. 5), therefore, only the gate A will pass the differential signal of 2 and this signal will be set by triggering the second flip-flop 14 (the first section of (i) as above and (k) of second flip-flop output $Q_{14}$ in FIG. 5).

On the other hand, when there is no signal passing through the gate circuit 8 (see 0 and third sections of gate passing signal (d) in FIG. 5), the flip-flop 12 will not turn see 0 and third sections of the first flip-flop output $Q_{12}$ of (g) in FIG. 5) so that only the gate B of the circuit 13 will pass a signal (see 0 and third sections of the gate B output (j) in FIG. 5) and the signal will be applied to the reset terminal of the second flip-flop 14 which will be reset (see second flip-flop output $Q_{14}$ of (k) in FIG. 5). Therefore, the second flip-flop 14 will be set when the gate ends in the period in which there is a signal passing through the gate circuit 8 and will be reset when the gate ends in the cycle in which there is no signal passing through the gate circuit 8 among the cycles repeated in succession.

Now, the delaying circuit 15 is a gate wherein the signal (delaying gate controlling signal of (l) in FIG. 5) obtained through an integrating circuit integrating the set output signal $Q_{14}$ of the second flip-flop 14 and the output signal (signal of (e) in FIG. 5) of the differentiating circuit 11 are made two input signals. If the threshold valve of the first input is $V_{TH15}$, as shown by (l) in FIG. 5, until this input voltage reaches this $V_{TH15}$, the second signal will not be able to pass through this gate and, therefore, during a fixed period $T_N$ as in (l) of FIG. 5 after the flip-flop 14 turns, the signal will not be able to pass. Therefore, if this period $T_N$ is selected to be larger than the pulse width of the differential signal, the differential signal in the first cycle will not pass through the gate 15.

If a signal passing through the gate circuit 8 is again produced during the gate period of the next cycle, the first flip-flop 12 will be again set and an output signal will be produced in the gate A of the circuit 13 by the same mechanism as described above. At this time, the second flip-flop 14 will remain in the state of the preceding cycle. If the resistor $R_{15}$ and condenser $C_{15}$ are so selected that the first input signal of the delaying gate 15 will have reached a potential sufficient for the signal to pass at this time, the differential signal applied to the second input will pass through the gate 15 and will set the third flip-flop 16 (see third flip-flop output (m) in FIg. 5).

Thus, the third flip-flop 16 shows that the received signal has passed through the gate 15 over the two successive cycles. Therefore, if the relay in the driving circuit 17 is driven to be actuated by such output $Q_{16}$ of (m) in FIG. 5, the operation of the relay will be made reliable.

It should be noted that, if there is no signal in the second cycle, the differential signal will pass through the gate B of the circuit 13 and the respective flip-flops 14 and 16 will be reset by this signal.

Determination of Wave Radiating Cycle

The wave radiating cycle shall be described with reference to FIGS. 1, 2 and 6.

In order to detect any reflected wave, the wave radiation cycle is determined after confirming that there is no input within a predetermined time successively after the completion of the signal detecting region ($\tau_1 - \tau_2$ as in (v) and (vi) of FIG. 4). Radiation cycle controlling is to be performed by discharging accumulated charge in the condenser $C_{18}$ of the time setting integrating circuit 18, and this discharge is controlled by the output of the pulse amplifying circuit 7 and turned output $\overline{Q}_9$ of the far point setting signal $Q_9$.

First of all, the received wave signal is used for the first reset signal. That is, in the pulse amplifying circuit 7, as shown in (c) in FIG. 6 showing its output, a pulse wave corresponding to the received wave signal of (b) in FIG. 6 appears as an output. Therefore, this output signal is turned with the inverter 24 so as to be a signal shown in (d) of FIG. 6 showing the inverter output. With this signal, a charge accumulated in the condenser $C_{18}$ is discharged through the diode $D_1$. The charge of this condenser is resumed after there is no signal. In case reflected waves (such as $q$ and $q'$ in (f) of FIG. 6) are produced in succession, the resetting will be made before this integrated value reaches the threshold value $V_{TH19}$ of the voltage comparing circuit 19. This voltage will reach $V_{TH19}$ in case there is no reflection in the period represented by $T_2$ in (f) of FIG. 6. Therefore, if the time $T_2$ is selected to be more than 2 to 3 times as long as the time for which the wave reciprocates, for example, between opposing wall surfaces, the next cycle will not begin until the echo disappears. Therefore, if the echo increases or decreases, the radiating cycle will be able to be varied accordingly. The echo time varies with the temperature and humidity and depends on the reflection factor of the opposed surfaces so greatly as to be unable to be always anticipated to be of a fixed value. Further, if the repeated cycle is made long enough, a mis-signal will be able to be prevented from occurring but the time required for the operation will be late.

The far point setting signal $\overline{Q}_9$ is used for the second resetting signal. $\overline{Q}_9$ is a signal starting substantially simultaneously with the beginning time of the cycle. Therefore, the condenser $C_{18}$ will be discharged substantially at the same time as its terminal voltage exceeds the before described $V_{TH19}$ and will remain on the 0 level (such as "p" in (f) of FIG. 6) as it is until the signal of $\overline{Q}_9$ returns to a high level.

The most important purpose of providing this second resetting signal is to improve the fact that, if the condenser is operated with only the first resetting signal, for example, when the emitted ultrasonic wave is interrupted purposely or the condenser $C_{18}$ is set in an open space in which there is no reflected signal at all, the level of the condenser $C_{18}$ will stop on a high level and the generation of the wave pulses will be no longer able to be maintained. In this sense, not only the far point setting signal $\overline{Q}_9$ but also, for example, the near point setting signal $\overline{Q}_{10}$ or pulse width setting signal $\overline{Q}_{20}$ or, extremely expressing, even an oscillation output can be used or another signal may be specially created.

The signal $\overline{Q}_9$ is particularly used because this signal can be taken to be the longest and, if the section in which the reflected waves until the echo are comparatively few is improved by using this signal, the selecting time length of $T_2$ will be able to be reduced to be comparatively short.

As in the above, the wave radiating intervals are so made as to be able to be automatically set in response to the echo of the setting place and, therefore, there will be substantially no mis-signal caused by the echo.

Figure 6:
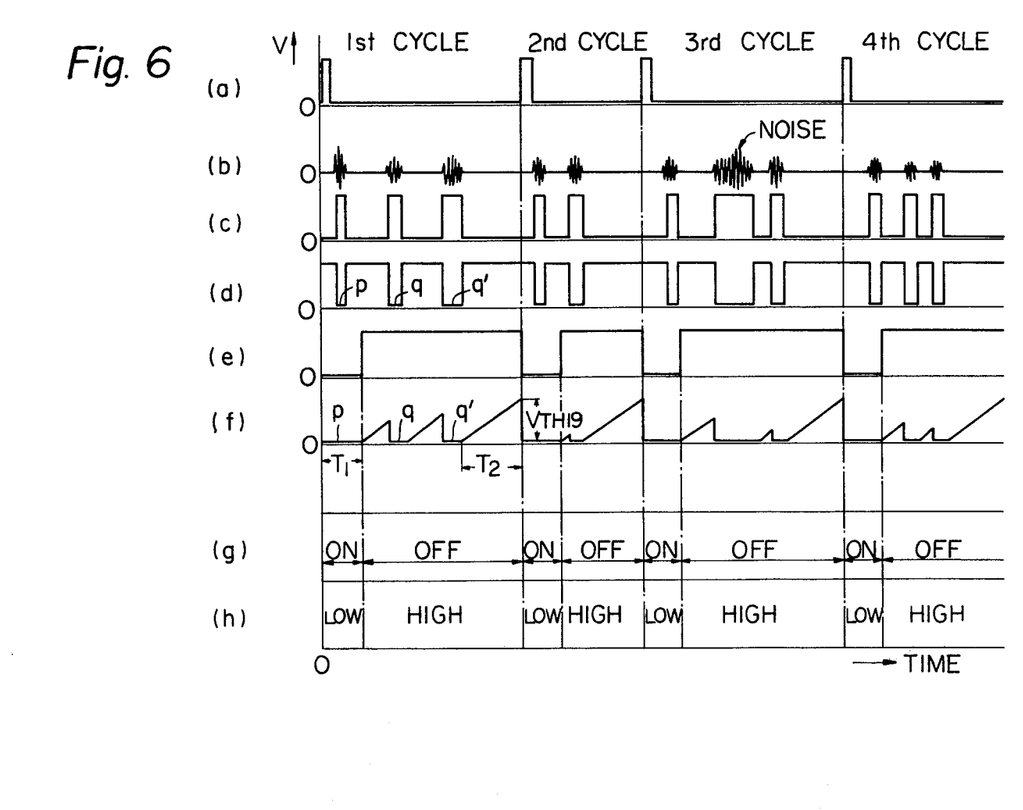
FIG. 6 is a time chart for explaining radiation interval control and level switching according to the present invention.

Further, this wave radiating manner is effective also against any foreign noises because, as shown in the third cycle in FIG. 6, if a foreign noise is generated, the condenser $C_{18}$ will be discharged during that cycle and, therefore, the beginning of the next cycle will be delayed. Therefore, in case the radiating intervals are fixed for noises of a long time width, if this manner is used against such noise, even in such case as causes a mis-signal, the mis-signal will be able to be prevented.

Output Level Switching Circuit

The switching circuit 5 shall be explained in the following.

As shown in FIG. 2, the switching circuit 5 is formed of a series circuit of the resistor $R_5$ and transistor $Q_5$ and is inserted on the secondary side of the transformer so that this transistor $Q_5$ will repeat a conduction and non-conduction with the far point setting signal $Q_9$ (see (e) and (g) of FIG. 6).

In case the transistor $Q_5$ is conducting, the resistor $R_5$ will be inserted as a load on the secondary side of the tuning transformer, nominal gain will reduce and the input level to the detecting circuit 6 will fall. On the other hand, when the transistor $Q_5$ is in OFF stage, the input level will rise.

The transistor $Q_5$ will be in ON state during the gate period and will be OFF outside the period. Therefore, after the end of the gate period, the sensitivity of detecting the echo or noise will become so high that it will be easy to distinguish whether the echo or noise has vanished or not. During the next gate period, the sensitivity will be again reduced so that the mis-signal will become extremely small.

Checking Switch

In the checking circuit 3, as shown in FIG. 2, the checking switch $SW_{CH}$ is inserted in parallel with the resistor $R_{31}$ for attenuating the input to the amplifier 4 (as connected in series with the resistor $R_{CH}$) and is used normally as opened. When this switch is in ON state, the resistors $R_{31}$ and $R_{CH}$ will be parallel with each other so that the attenuation on the input side will be reduced and, after all, the sensitivity as a whole will rise.

This checking switch is to be used for checking at the time of installing the device and intermediate time and is a switch for confirming whether the set state is favorable or not to see that there is no signal of a level near the detecting level, so as to render the operation of the device more reliable.

Summarizing the respective features of the present invention:

(i) The ultrasonic wave pulse radiating intervals are not fixed. After the waves are once radiated:
  (a) A fixed time $T_1$ for waiting is provided all the time and then a time $T_2$ for ascertaining whether a received wave exists or not is provided.
  (b) If there is a received wave signal in this period of $T_2$, after this received wave signal ends, the period of the same $T_2$ will be again set as a period for ascertaining whether there is a received wave or not in the same manner as in the above.
  (c) After several times of the received wave signal have elapsed and in case it is confirmed that there is no received wave signal within the period of this $T_2$, the next wave is radiated.

(ii) An indication of the existence of an object will be made only in case the waves are radiated at the optional intervals as above and there is a received wave signal continuing for more than two periods.

(iii) The sensitivity for ascertaining whether the received wave signal exists or not is made higher than the sensitivity of a signal treating system for detecting the existence of an object, so that the capacity of removing echoes and noises will be thereby elevated.

(iv) The period of $T_1$ of the foregoing paragraph (i), (a) increases the basic length of the wave radiating period depending on increases of detecting distance, by means of a far point setting signal.

(v) A checking switch for elevating the detecting sensitivity by a fixed level is provided so that it will be confirmed that the setting at the time of installation is positive.

What is claimed is:

1. An ultrasonic wave echo-type switch comprising:
  an oscillator for generating an ultrasonic wave,
  an emitter excited by an output of said oscillator to radiate the ultrasonic wave into air,
  a receiver for receiving any reflected ultrasonic wave from an object to be detected,
  a wave-receiving timing control section determining a timing period for confirming the reflected wave,
  a reflected wave confirming section for confirming whether any reflected wave is received during said timing period,
  a received wave confirming section for confirming that the reflected wave is received during at least two successive timing periods,
  a reset operating section for resetting the received wave confirming section in the absence of the received wave during the timing period,
  an input absence detecting section for detecting that no input to the receiver continues for a fixed time after the timing period and providing a next wave radiation controlling signal in response to such detection, and
  a next wave radiation controlling section for controlling the next wave radiation responsive to said signal of the input absence detecting section.

2. A switch according to claim 1 wherein said input absence detecting section comprises an integrating circuit normally integrating a constant voltage and to be reset by an input representing a presence of received waves, and a voltage comparing circuit providing said next wave radiation controlling signal when an output of said integrating circuit is raised to be above a predetermined level.

3. A switch according to claim 2 wherein said integrating circuit is actuated after a termination of said wave-receiving timing period.

4. A switch according to claim 1 further including a switching section actuated in response to an output signal of said received wave confirming section, wherein said received wave confirming section comprises a first multivibrator reversed by means of an output of said reflected wave confirming section and reset during a period after a termination of said wave-receiving timing period and before the next wave radiation, a storing circuit for storing reversed state of said multivibrator, and a second multivibrator for controlling said switching section, so that said second multivibrator is actuated to operate the switching circuit when there is an output of said storing circuit and there is the reflected wave successively in a next wave-receiving timing period, whereas said storing circuit and second multivibrator are reset when there is no reflected wave during the next and following wave-receiving timing period.

5. A switch according to claim 1 wherein said received wave confirming section comprises a first multivibrator reversed by means of an output of said relected wave confirming section and reset at the time of next wave radiation, a storing circuit for storing reversed state of said first multivibrator at the time of termination of said wave-receiving timing period, a delay circuit for delaying an output of said storing circuit, a differentiating circuit for confirming the termination of the wave-receiving timing period, and a second multivibrator to be reversed responsive to respective outputs of said delay circuit and differentiating circuit.

* * * * *